US012753819B2

(12) United States Patent
Kim et al.

(10) Patent No.: US 12,753,819 B2
(45) **Date of Patent: *Oct. 6, 2026**

(54) ZERO POISSON'S RATIO STRUCTURE AND A PLANAR STRUCTURE OF ZERO POISSON'S RATIO IN WHICH THE STRUCTURE IS MATRIXED IN A PLANE

(71) Applicant: RESEARCH & BUSINESS FOUNDATION SUNGKYUNKWAN UNIVERSITY, Suwon-si (KR)

(72) Inventors: Tae Il Kim, Suwon-si (KR); Byeong Hak Park, Suwon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 1188 days.

This patent is subject to a terminal disclaimer.

(21) Appl. No.: 17/706,786

(22) Filed: Mar. 29, 2022

(65) Prior Publication Data

US 2022/0325768 A1 Oct. 13, 2022

(30) Foreign Application Priority Data

| | | |
|---|---|---|
| Mar. 30, 2021 | (KR) | 10-2021-0041020 |
| Jan. 25, 2022 | (KR) | 10-2022-0010961 |
| Mar. 4, 2022 | (KR) | 10-2022-0028029 |

(51) Int. Cl.
*F16F 1/36* (2006.01)
*F16F 1/373* (2006.01)

(52) U.S. Cl.
CPC ............ *F16F 1/3615* (2013.01); *F16F 1/373* (2013.01); *F16F 2228/007* (2013.01); *F16F 2234/02* (2013.01)

(58) Field of Classification Search
CPC ...... F16F 1/36; F16F 1/3615; F16F 2228/063; F16F 1/373; F16F 2228/007; F16F 2234/02
See application file for complete search history.

(56) References Cited

U.S. PATENT DOCUMENTS

| | | | | |
|---|---|---|---|---|
| 9,447,839 B2 * | 9/2016 | Dunning | ............... | F16F 15/073 |
| 2011/0155137 A1 * | 6/2011 | Martin | ............... | A41D 13/1146 29/527.1 |

(Continued)

FOREIGN PATENT DOCUMENTS

| | | | | |
|---|---|---|---|---|
| AU | 2010343220 A1 * | 7/2012 | ......... | A41D 13/1146 |
| CN | 104157186 B * | 1/2017 | | |

(Continued)

OTHER PUBLICATIONS

CN 112420134 A (Feb. 26, 2021) (Year: 2021).*

*Primary Examiner* — Robert A. Siconolfi
*Assistant Examiner* — Mahbubur Rashid
(74) *Attorney, Agent, or Firm* — NSIP Law

(57) ABSTRACT

Disclosed is a zero Poisson's ratio structure including a central pillar; at least two branched connectors extending radially from a lower end of the central pillar, wherein each of the branched connectors includes: a first segmental portion extending inclinedly upwardly or downwardly from the central pillar; and a second segmental portion extending inclinedly downwardly or upwardly from a distal point of the first segmental portion, wherein the extension directions of the first and second segmental portions are opposite to each other; and each leg extending perpendicularly downwardly from a distal point of each of the second segmental portions, wherein due to a force pressing the central pillar, each of an angle between the central pillar and the first segmental portion, an angle between the first segmental (Continued)

100

100 portion and the second segmental portion, and an angle between the second segmental portion and the leg is variable.

10 Claims, 14 Drawing Sheets

(56) References Cited

U.S. PATENT DOCUMENTS

| | | | | |
|---|---|---|---|---|
| 2013/0171019 | A1 | 7/2013 | Gessler et al. | |
| 2015/0192183 | A1* | 7/2015 | Subramanian Muthu .................. | B60R 19/26 267/141 |
| 2016/0032997 | A1* | 2/2016 | Seepersad ............. | F16F 1/3737 267/141 |

FOREIGN PATENT DOCUMENTS

| | | | | | |
|---|---|---|---|---|---|
| CN | 209657302 | U | * | 11/2019 | |
| CN | 210742944 | U | * | 6/2020 | |
| CN | 111720467 | A | * | 9/2020 | .............. F16F 7/128 |
| CN | 112420134 | A | * | 2/2021 | ............. G16C 10/00 |
| GB | 2514074 | A | * | 11/2014 | ............. A61F 2/915 |
| GB | 2578296 | A | * | 5/2020 | ............. B31D 3/002 |

* cited by examiner

100

100

ZERO POISSON'S RATIO STRUCTURE AND A PLANAR STRUCTURE OF ZERO POISSON'S RATIO IN WHICH THE STRUCTURE IS MATRIXED IN A PLANE

CROSS-REFERENCE TO RELATED APPLICATION

This application claims a benefit under 35 U.S.C. § 119(a) of Korean Patent Application No. 10-2021-0041020 filed on Mar. 30, 2021, Korean Patent Application No. 10-2022-0010961 filed on Jan. 25, 2022, and Korean Patent Application No. 10-2022-0028029 filed on Mar. 4, 2022, on the Korean Intellectual Property Office, the entirety of all disclosures of which are incorporated herein by reference for all purposes.

BACKGROUND

Field

The present disclosure relates to a structure having a zero Poisson's ratio and a planar array having a zero Poisson's ratio in which the structures are arranged in a matrix form and in a plane.

Description of Related Art

A Poisson's ratio close to zero allows stress from mechanical impact to spread to a material in a reduced manner. Implementation of the near-zero Poisson's ratio may be used in various fields.

In particular, the near-zero Poisson's ratio may be used in fields such as electronic circuits, sensors, and soft robots. For example, in order to avoid or maximize mechanical noise in an electronic circuit, a zero Poisson's ratio structure may be disposed therein or a zero Poisson's ratio structure and a structure having another Poisson's ratio may be arranged therein to control stress of a monolithic circuit.

Furthermore, in a sensor or other electronic device, performance thereof may be improved by allowing stress not to spread therein via stress control. Further, controlling the stress in a certain mechanical stimulus may be applied to the field of actuators or robots.

In a prior art, many studies have been conducted to fabricate an anisotropic structure or an auxetic structure to achieve a Poisson's ratio to control the stress. However, in this case, there is a disadvantage in that it is difficult to design a complex structure and it is difficult to confine the stress. Further, in the prior art, there has been little research on a structure that may implement the zero Poisson's ratio.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter.

A purpose of the present disclosure is to provide a novel structure having a Poisson's ratio close to zero. In particular, a purpose of the present disclosure is to provide a planar array in which the structures of the Poisson's ratio close to zero are arranged in a line or matrix form and in a plane.

Purposes in accordance with the present disclosure are not limited to the above-mentioned purpose. Other purposes and advantages in accordance with the present disclosure as not mentioned above may be understood from following descriptions and more clearly understood from embodiments in accordance with the present disclosure. Further, it will be readily appreciated that the purposes and advantages in accordance with the present disclosure may be realized by features and combinations thereof as disclosed in the claims.

A first aspect of the present disclosure provides a zero Poisson's ratio structure comprising: a central pillar; at least two branched connectors extending radially from a lower end of the central pillar, wherein each of the branched connectors includes: a first segmental portion extending inclinedly upwardly or downwardly from the central pillar; and a second segmental portion extending inclinedly downwardly or upwardly from a distal point of the first segmental portion, wherein the extension directions of the first and second segmental portions are opposite to each other; and each leg extending perpendicularly downwardly from a distal point of each of the second segmental portions, wherein due to a force pressing the central pillar, each of an angle between the central pillar and the first segmental portion, an angle between the first segmental portion and the second segmental portion, and an angle between the second segmental portion and the leg is variable.

Although the central pillar is displaced in a direction from top to bottom due to the force pressing the pillar, there is little displacement of the structure in a horizontal direction perpendicular to a direction of the pressing force to the structure.

In the present disclosure, the zero Poisson's ratio means that Poisson's ratio is ideally zero. However, this does not mean only a case where the Poisson's ratio is strictly 0. This may include a case in which there is almost no horizontal displacement, and a case in which a slight horizontal displacement due to an error.

In one implementation of the first aspect, the structure includes an elastic structure. Thus, when the entire structure is made of the elastic material, each of an angle between the central pillar and the first segmental portion, an angle between the first segmental portion and the second segmental portion, and an angle between the second segmental portion and the leg is variable while portions other than a joint between the central pillar and the first segmental portion, a joint between the first segmental portion and the second segmental portion, and a joint between the second segmental portion and the leg have little or no deformation.

Elasticity of the elastic material may be arbitrarily set according to the purpose of use, that is, based on a strength of the pressing force and the displacement under the pressing force. For example, the structure has a modulus of elasticity in a range of Kilo to Mega Pascal.

In one implementation of the first aspect, the branched connectors are spaced from each other by an equal angular spacing.

In one implementation of the first aspect, a number of the branched connectors is four, wherein the branched connectors are spaced from each other by an equal angular spacing of 90 degrees.

In one implementation of the first aspect, a value determined based on a following Equation 1 when a length of the leg is h, a length of the second segmental portion is 1, and an angle between the second segmental portion and an imaginary horizontal line perpendicular to the leg is θ is defined as $\upsilon_p$, wherein a value determined based on the following Equation 1 when the length of the leg is h, a length of the first segmental portion is 1, and an angle between the first segmental portion and the imaginary horizontal line perpendicular to the leg is θ is defined as $\upsilon_n$, $$\upsilon = \frac{[h/l + \sin(\theta)\sin(\theta)]}{\cos^2(\theta)}, \quad \text{(Equation 1)}$$

wherein absolute values of $\upsilon_p$ and $\upsilon_n$ are equal to each other.

In one implementation of the first aspect, lengths of the first segmental portion and the second segmental portion are equal to each other, wherein an angle between an imaginary horizontal line perpendicular to the leg and the first segmental portion is equal to an angle between the imaginary horizontal line perpendicular to the leg and the second segmental portion.

A second aspect of the present disclosure provides a planar array of structures of a zero Poisson's ratio arranged in a matrix form and in a plane, wherein the array comprises: central pillars arranged in a matrix form and spaced from each other by a regular spacing; four branched connectors extending from a lower end of each central pillar in a radial direction and toward a central pillar adjacent thereto, wherein the four branched connectors are spaced from each other by an equal angular spacing, wherein each of the branched connectors includes: a first segmental portion extending inclinedly upwardly or downwardly from the central pillar; and a second segmental portion extending inclinedly downwardly or upwardly from a distal point of the first segmental portion, wherein the extension directions of the first and second segmental portions are opposite to each other; and legs extending perpendicularly downwardly from distal points of the second segmental portions, respectively, wherein the legs include non-sharing legs positioned at each of outer edges of the matrix form, and each sharing leg positioned between adjacent two central pillars and connected to two second segmental portions respectively extending from the adjacent two central pillars, wherein due to a force pressing the central pillar, each of an angle between the central pillar and the first segmental portion, an angle between the first segmental portion and the second segmental portion, and an angle between the second segmental portion and the leg is variable.

In this case, when a pressing force is applied toward one point, a force in a direction perpendicular to a direction of the pressing force is not applied to another position.

In one implementation of the second aspect, a value determined based on a following Equation 1 when a length of the leg is h, a length of the second segmental portion is 1, and an angle between the second segmental portion and an imaginary horizontal line perpendicular to the leg is θ is defined as $\upsilon_p$, wherein a value determined based on the following Equation 1 when the length of the leg is h, a length of the first segmental portion is 1, and an angle between the first segmental portion and the imaginary horizontal line perpendicular to the leg is θ is defined as $\upsilon_h$, $$\upsilon = \frac{[h/l + \sin(\theta)\sin(\theta)]}{\cos^2(\theta)}, \quad \text{(Equation 1)}$$

wherein absolute values of $\upsilon_p$ and $\upsilon_n$ are equal to each other.

A third aspect of the present disclosure provides a cylindrical array in which structures of a zero Poisson's ratio are arranged in a three dimensional manner, wherein the array comprises: central pillars arranged in circumferential and length directions and on an outer face of an imaginary cylinder, wherein a top face of each central pillar faces inwardly of the cylinder; and four branched connectors extending radially and outwardly from each of the central pillars and toward a central pillar adjacent thereto, wherein the four branched connectors are spaced from each other by an equal angular spacing, wherein each branched connector includes: a first segmental portion extending inclinedly upwardly or downwardly from the central pillar; and a second segmental portion extending inclinedly downwardly or upwardly from a distal point of the first segmental portion, wherein the extension directions of the first and second segmental portions are opposite to each other, wherein each of an angle between the central pillar and the first segmental portion, and an angle between the first segmental portion and the second segmental portion is variable due to a force applied to the array.

In this case, in the cylindrical array in which the structures of zero Poisson's ratio are arranged in a three-dimensional manner such that a top face of the central pillar faces inwardly of the imaginary cylinder, the displacement in the length and circumferential directions of the cylinder due to a radial force outwardly from a center of the cylinder has no change.

In one implementation of the third aspect, the array further comprises legs extending outwardly from distal points of the second segmental portions, respectively, wherein the legs includes: non-sharing legs positioned on a top and a bottom of the cylinder; and each sharing leg positioned between adjacent two central pillars and connected to two second segmental portions respectively extending from the adjacent two central pillars.

A fourth aspect of the present disclosure provides a cylindrical array in which structures of a zero Poisson's ratio are arranged in a three dimensional manner, wherein the array comprises: central pillars arranged in circumferential and length directions and on an outer face of an imaginary cylinder, wherein a top face of each central pillar faces outwardly of the cylinder; and four branched connectors extending radially and inwardly from each of the central pillars and toward a central pillar adjacent thereto, wherein the four branched connectors are spaced from each other by an equal angular spacing, wherein each branched connector includes: a first segmental portion extending inclinedly upwardly or downwardly from the central pillar; and a second segmental portion extending inclinedly downwardly or upwardly from a distal point of the first segmental portion, wherein the extension directions of the first and second segmental portions are opposite to each other, wherein each of an angle between the central pillar and the first segmental portion, and an angle between the first segmental portion and the second segmental portion is variable due to a force applied to the array.

In this case, in the cylindrical array in which the structures of zero Poisson's ratio are arranged in a three-dimensional manner such that a top face of the central pillar faces outwardly of the imaginary cylinder, the displacement in the length and circumferential directions of the cylinder due to a radial force inwardly toward a center of the cylinder has no change.

In one implementation of the fourth aspect, the array further comprises legs extending inwardly from distal points of the second segmental portions, respectively, wherein the legs includes: non-sharing legs positioned on a top and a bottom of the cylinder; and each sharing leg positioned between adjacent two central pillars and connected to two second segmental portions respectively extending from the adjacent two central pillars.

In another aspect of the present disclosure, the present disclosure provides a stack in which planar arrays of the structures of the zero Poisson's ratio according to the present disclosure are stacked in a three-dimensional manner.

The physical properties of the planar array may be modified based on the environment to vary the characteristics of the three-dimensional stack.

In still another aspect, the present disclosure provides a hybrid type planar array of structures having a zero Poisson's ratio.

For example, the hybrid type planar array of structures having a zero Poisson's ratio may include a planar array of the structures of zero Poisson's ratio arranged in the form of the matrix form and in a plane, and structures extending from the non-sharing legs located at the sides of the matrix form and having the larger vertical dimension and having the positive Poisson's ratio, wherein the planar array of the structures of zero Poisson's ratio are surrounded with the structures having the positive Poisson's ratio. This array may act as a negative pressure chamber.

Since the above structure has various curves, a method using 3D printing may be used, and various methods such as milling and laser machining may be utilized. An appropriate structure may be calculated based on a location, and then may be directly printed. Alternatively, a two-dimensional drawing may be rolled, or several structures may be stacked.

The present disclosure may realize the structure with a Poisson's ratio close to zero. The present disclosure provides a planar array having a zero Poisson's ratio in which the structures with a Poisson's ratio close to zero are arranged in a matrix form.

In addition to the effects as described above, specific effects in accordance with the present disclosure will be described together with following detailed descriptions for carrying out the disclosure.

DETAILED DESCRIPTIONS

Figure 1A:
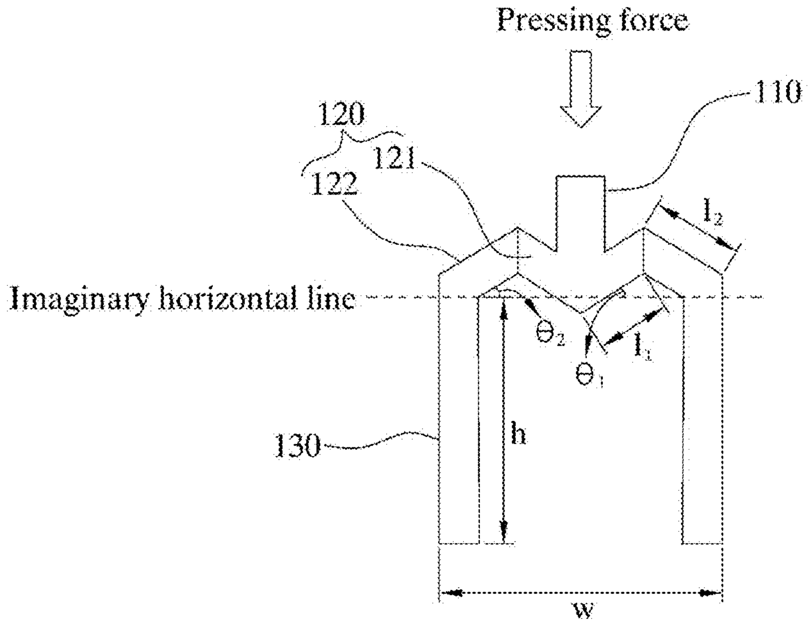
FIG. 1A shows a vertical cross-section (left) of a structure with a zero Poisson's ratio in which there are 4 legs.

For simplicity and clarity of illustration, elements in the drawings are not necessarily drawn to scale. The same reference numbers in different drawings represent the same or similar elements, and as such perform similar functionality. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entirety of list of elements and may not modify the individual elements of the list. When referring to "C to D", this means C inclusive to D inclusive unless otherwise specified.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers.

It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may also be present.

Further, as used herein, when a layer, film, region, plate, or the like is disposed "on" or "on a top" of another layer, film, region, plate, or the like, the former may directly contact the latter or still another layer, film, region, plate, or the like may be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like is disposed "below" or "under" another layer, film, region, plate, or the like, the former may directly contact the latter or still another layer, film, region, plate, or the like may be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1A shows a vertical cross-section (left) of a structure 100 of a zero Poisson's ratio having 4 legs by way of example. FIG. 1C illustrates a perspective view thereof.

The zero Poisson's ratio structure 100 according to the present disclosure may be constructed such that even though a central pillar 110 thereof is displaced downwardly due to a force pressing down the central pillar 110, a width w of the structure in a direction perpendicular to a direction of the pressing force of the structure is substantially constant.

The zero Poisson's ratio structure according to the present disclosure includes a central pillar 110; two or more branched connectors 120 extending radially from a lower end of the central pillar, each of the branched connectors having a first segmental portion 121 extending inclinedly upwardly from the central pillar and a second segmental portion 122 extending inclinedly downwardly from a distal point of the first segmental portion; and each leg 130 extending perpendicularly downwardly from a distal point of each of the second segmental portions.

When the structure according to the present disclosure is viewed in a plan view, that is, when the central pillar is viewed in a direction from top to bottom, the branched connectors extend radially from the bottom of the central pillar. FIG. 1 shows an example having four branched connectors. The four branched connectors spaced apart from each other by an angle of 90 degrees are connected to the central pillar.

Each of the branched connectors 120 includes a first segmental portion 121 and a second segmental portion 122. The first segmental portion 121 is a portion connected to the lower end of the central pillar, and the second segmental portion 122 is a portion connected to the leg. When the structure is viewed in a front view, the first segmental portion 121 extends inclinedly upwardly from the lower end of the central pillar to form an acute angle with respect to the central pillar. The second segmental portion 121 extends inclinedly downward from the first segmental portion 121 and is connected to the leg. As another non-limiting example, FIG. 1D illustrates a structure having branched connector including a first segmental portion downwardly extending from a bottom of a central pillar and a second segmental portion extending upwardly from a distal point of the first segmental portion.

A joint between the central pillar and the first segmental portion, a joint between the first segmental portion and the second segmental portion, and a joint between the second segmental portion and the leg perform articulation motion.

Figure 1B:
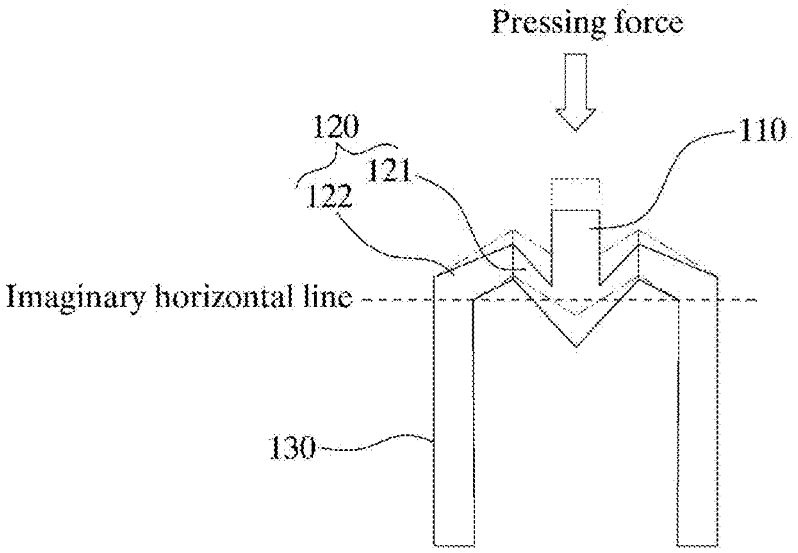
FIG. 1B is a diagram illustrating a state in which the structure of FIG. 1A is deformed by a force pressing the structure in a direction from a top to a bottom.
Figure 1C:
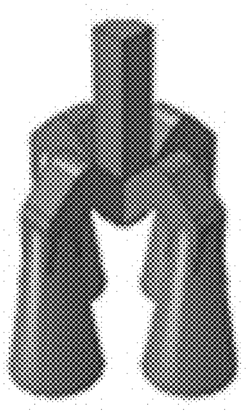
FIG. 1C shows a perspective view of a structure of a zero Poisson's ratio having four legs.
Figure 1D:
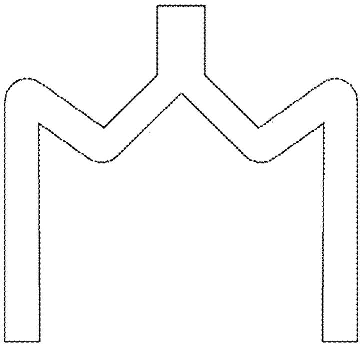
FIG. 1D illustrates a structure having branched connector including a first segmental portion downwardly extending from a bottom of a central pillar and a second segmental portion extending upwardly from a distal point of the first segmental portion.

As illustrated in FIG. 1B, due to the force pressing the central pillar, an angle between the central pillar and the first segmental portion may be decreased to make a sharper arrow shape, while an angle between the first segmental portion and the second segmental portion may be increased, while an angle between the second segmental portion and the leg may be decreased. However, although the structure is deformed, a width w of the structure is substantially constant.

Preferably, in order to construct the structure such that change in a width direction dimension of the structure is substantially zero relative to the pressing force to achieve a zero Poisson's ratio, a following condition is met: a value determined based on a following Equation 1 when a length of the leg is h, a length $l_2$ of the second segmental portion is l, and an angle $\theta_2$ between the second segmental portion and an imaginary horizontal line perpendicular to the leg is θ is defined as $\upsilon_p$, wherein a value determined based on the following Equation 1 when the length of the leg is h, a length $l_1$ of the first segmental portion is 1, and an angle $\theta_1$ between the first segmental portion and the imaginary horizontal line perpendicular to the leg is θ is defined as $\upsilon_n$, wherein absolute values of $\upsilon_p$ and $\upsilon_n$ are equal to each other:

$$\upsilon = \frac{[h/l + \sin(\theta)\sin(\theta)]}{\cos^2(\theta)}, \quad \text{(Equation 1)}$$

When the absolute values of $\upsilon_p$ and $\upsilon_n$ are the same as each other, a displacement of the structure in a horizontal direction corresponds to zero.

In addition, the lengths of the first segmental portion and the second segmental portion are the same as each other, and an angle between the imaginary horizontal line perpendicular to the leg and the first segmental portion, and an angle between the imaginary horizontal line perpendicular to the leg and the second segmental portion are equal to each other. In this case, the displacement of the structure in the horizontal direction becomes zero.

Figure 5A:
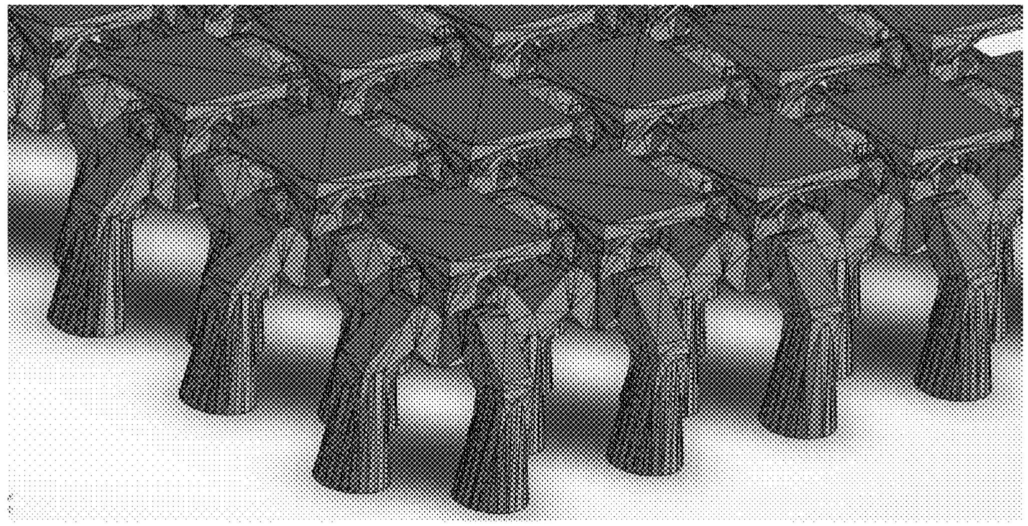
FIG. 5A shows a perspective view of a planar array with zero Poisson's ratio in which the structures of FIG. 1A are arranged in a matrix form and in a plane.
Figure 5B:
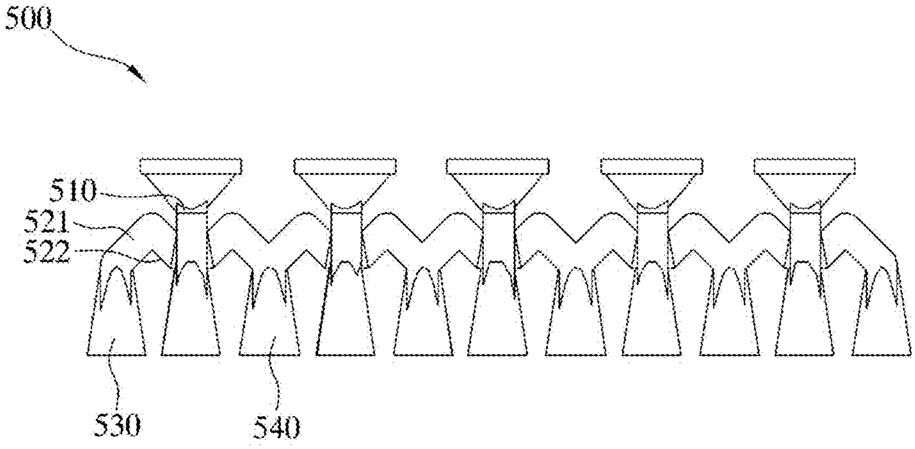
FIG. 5B shows a front view of FIG. 5A.
Figure 5C:
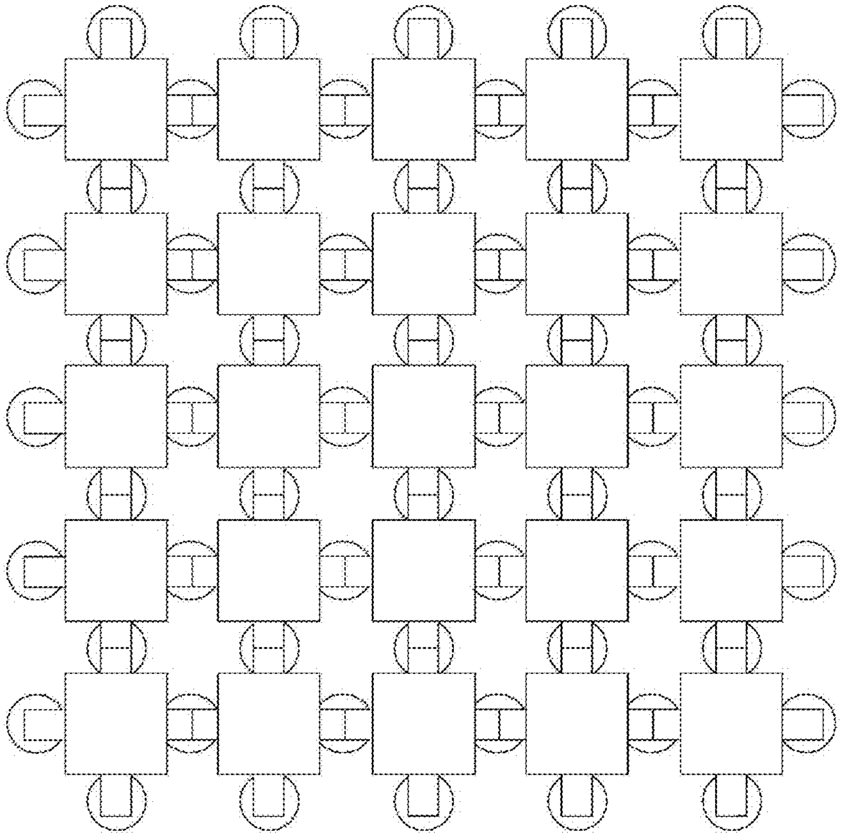
FIG. 5C shows a top view of FIG. 5A.

FIG. 5A shows a perspective view of a planar array with zero Poisson's ratio in which the structures of FIG. 1A are arranged in a matrix form and in a plane. FIG. 5B shows a front view of FIG. 5A. FIG. 5C shows a top view of FIG. 5A.

A planar array 500 includes central pillars 510 arranged in a matrix form and spaced from each other by a regular spacing; four branched connectors extending from a lower end of each central pillar in a radial direction, wherein the four branched connectors are spaced from each other by an equal angular spacing, wherein each of the branched connectors includes a first segmental portion 521 extending inclinedly upwardly from the central pillar and a second segmental portion 522 extending inclinedly downwardly from a distal point of the first segmental portion; and legs 530 extending perpendicularly downwardly from distal points of the second segmental portions, respectively, wherein the legs include non-sharing legs 530 positioned at each of outer edges of the matrix form, and a sharing leg 540 positioned between adjacent two central pillars and connected to two second segmental portions respectively extending from the adjacent two central pillars.

The arrangement of the central pillars in the matrix form means that the central pillars are arranged in a matrix form and are respectively disposed at intersection points in a grid arrangement in a plan view of the planar array, that is, viewed in a direction from top to bottom.

The four branched connectors radially extending from at the lower end of the single central pillar may be spaced from each other by an equal angular spacing of an angle of 90 degrees in the plan view.

In one example, the branched connectors extending from the central pillar of the coordinates (2,2) may extend toward the central pillars of coordinates (1,2), (2,1), (3,2), and (2,3) adjacent thereto in a row or column direction of the matrix form.

In another example, the branched connectors extending from the central pillar of the coordinates (2,2) may extend toward the central pillars of coordinates (1,1), (3,1), (3,3), and (1,3) adjacent thereto in a diagonal direction of the matrix form.

The non-sharing leg 530 may be positioned at the outer edge of the array of the matrix form and refers to a leg connected to a single branched connector. The sharing leg 540 may be located between two adjacent central pillars in the matrix form and may be connected to two branched connectors from the two central pillars, respectively.

Due to a force pressing the central pillar, each of an angle between the central pillar and the first segmental portion, an angle between the first segmental portion and the second segmental portion, and an angle between the second segmental portion and the leg is variable.

Figure 4A:
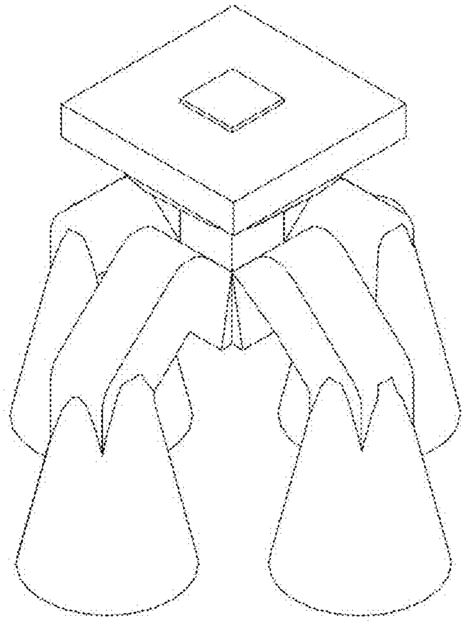
FIG. 4A is an image of a 3D file designed for manufacturing a structure according to the present disclosure via 3D printing.
Figure 4B:
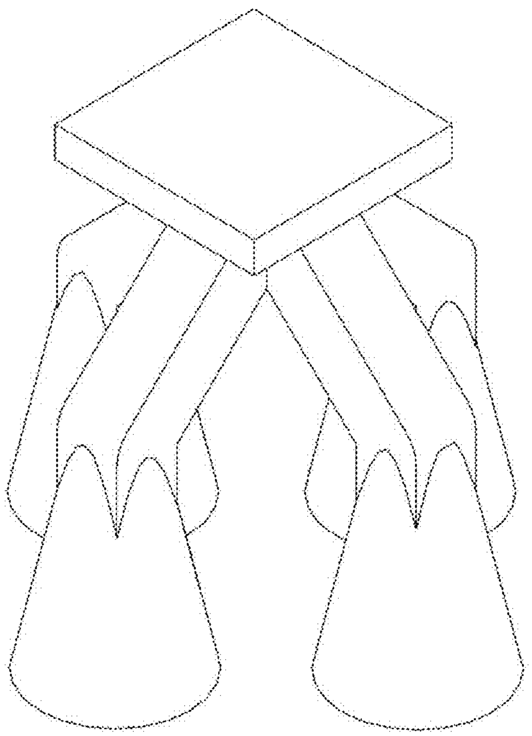
FIG. 4B is an image of a 3D file designed for fabrication of a structure showing a positive Poisson's ratio as a control via 3D printing.
Figure 4C:
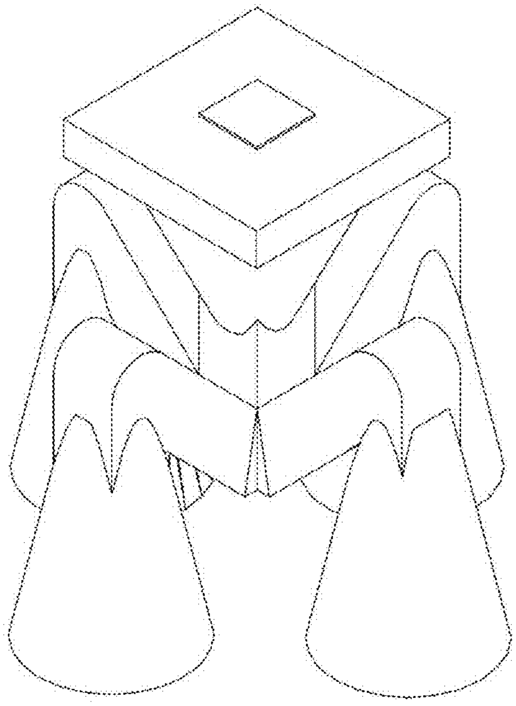
FIG. 4C is an image of a 3D file designed for fabrication of a structure showing a negative Poisson's ratio as a control via 3D printing.

FIG. 4A is an image of a 3D file designed for manufacturing a structure according to the present disclosure via 3D printing. FIG. 4B is an image of a 3D file designed for fabrication of a structure showing a positive Poisson's ratio as a control via 3D printing. FIG. 4C is an image of a 3D file designed for fabrication of a structure showing a negative Poisson's ratio as a control via 3D printing.

The structure according to the present disclosure is manufactured using a 3D printer based on 3D design as shown in FIG. 4A. The 3D printing is performed using flexible resin of FORM-LAB. The 3D printing of the flexible material may allow the configuration that due to a force pressing the central pillar, each of an angle between the central pillar and the first segmental portion, an angle between the first segmental portion and the second segmental portion, and an angle between the second segmental portion and the leg is variable.

For relative evaluation in addition to absolute evaluation, a positive structure in which the branched connector connecting the central pillar and the leg to each other is not segmented and extends directly to the leg from the bottom of the central pillar downwardly is prepared as a control structure. Further, a negative structure as another control structure is prepared in which the branched connector connecting the central pillar and the leg is not segmented, and extends directly to the leg from the bottom of the central pillar upwardly. The two control structures are manufactured in the same way as the 3D printer based manufacturing method of the structure according to the present disclosure based on the 3D designs as shown in FIG. 4B and FIG. 4C, respectively.

To evaluate performance of the structure of the zero Poisson's ratio according to the present disclosure, the displacement in the horizontal direction with respect to the force pressing the central pillar and the resulting Poisson's ratio are measured. For the relative comparison, the displacement and the Poisson's ratio of each of the control structures are measured.

Figure 2:
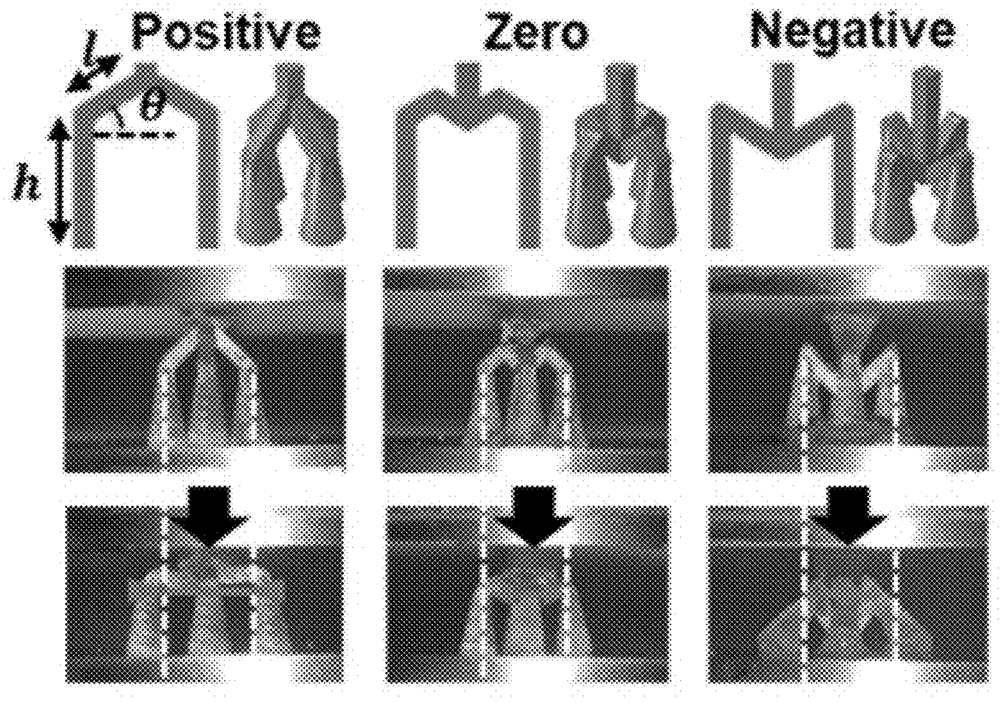
FIG. 2 shows a measurement result of a displacement in a horizontal direction with respect to a force pressing the central pillar and a resulting Poisson's ratio.

FIG. 2 shows the measurement result of the displacement in the horizontal direction and the resulting Poisson's ratio with respect to the force pressing the central pillar. The positive structure is shown at the left in the cross-sectional drawing of the structure in FIG. 2, and the negative structure is shown at the right in the cross-sectional drawing of the structure in FIG. 2. The structure of the zero Poisson's ratio according to the present disclosure is shown at a central view in the cross-sectional drawing of the structure of FIG. 2.

It may be identified that in the positive structure as a control, a large positive displacement in the horizontal direction occurs relative to the pressing force. Further, it may be identified that in the negative structure as another control, a large negative displacement in the horizontal direction occurs relative to the pressing force. However, it may be identified that the structure according to the present disclosure has almost no displacement in the horizontal direction relative to the pressing force.

Figure 3A:
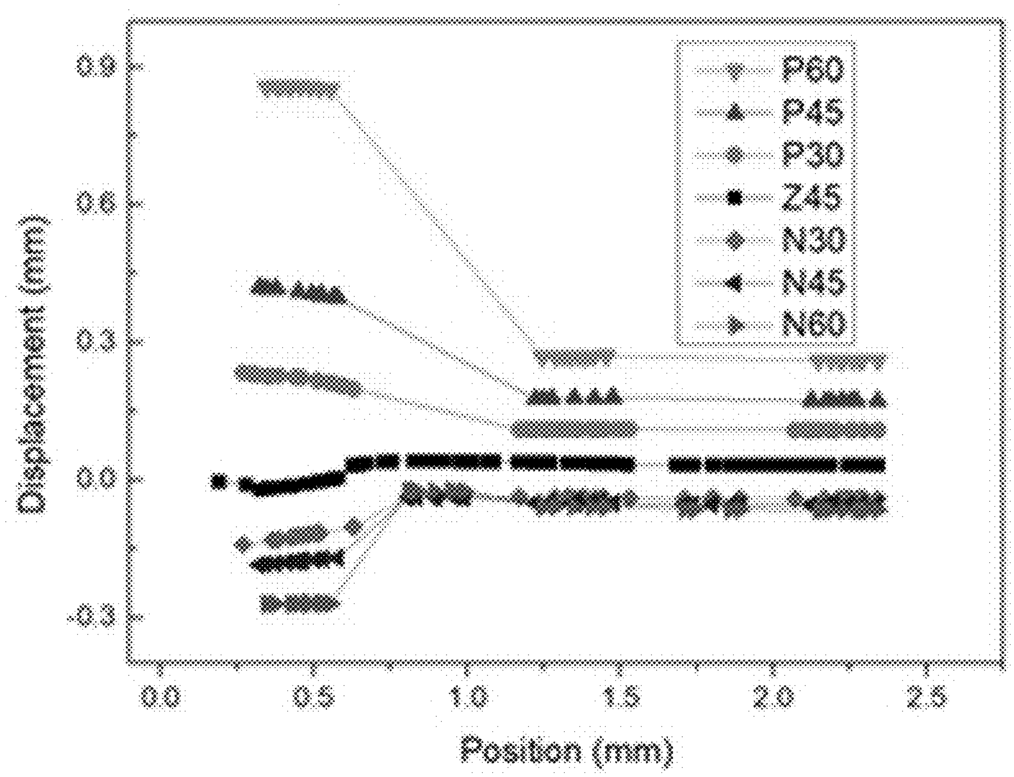
FIG. 3A shows a result of a measured horizontal displacement value.
Figure 3B:
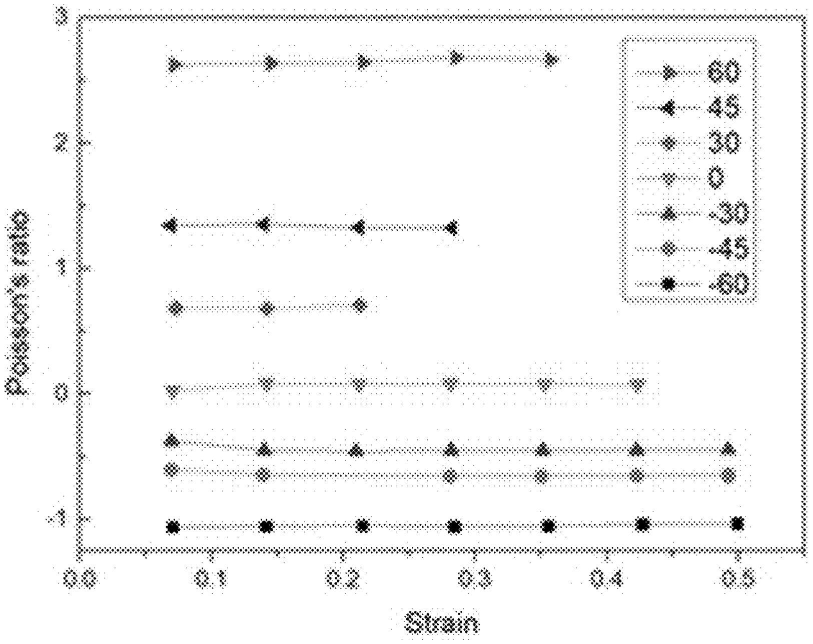
FIG. 3B shows a value of a Poisson's ratio corresponding thereto.

FIG. 3A shows the result of the measured horizontal displacement value, and FIG. 3B shows the value of the Poisson's ratio corresponding thereto.

In the positive structure as the control, a value of P60 in FIG. 3A and a value 60 in FIG. 3B refer to values when the angle between the imaginary line perpendicular to the leg and the connector is 60 degrees, and P45 and 45 refer to values when the angle is 45 degrees, P30 and 30 refer to values when the angle is 30 degrees.

In the negative structure as the control, a value of N60 in FIG. 3A and a value −60 in FIG. 3B refer to values when the angle between the imaginary line perpendicular to the leg and the connector is 60 degrees, and N45 and −45 refer to values when the angle is 45 degrees, N30 and −30 refer to values when the angle is 30 degrees.

Z45 in FIG. 3A and 0 in FIG. 3B are related to the structure in the present disclosure. The angle between the imaginary line perpendicular to the leg and each of the first segmental portion and the second segmental portion of the connector in accordance with the present disclosure is 45 degrees.

As identified in FIG. 3A, in the structure Z45 of the present disclosure, the horizontal displacement is a value close to zero. Thus, the structure has almost no change in the horizontal displacement with respect to the pressing force. However, the controls have the change in the horizontal displacement.

Further, as identified in FIG. 3B, in the structure 0 according to the present disclosure, the Poisson's ratio as the displacement in the horizontal direction with respect to the pressing force maintains 0 even at various values of the pressing force.

Figure 6:
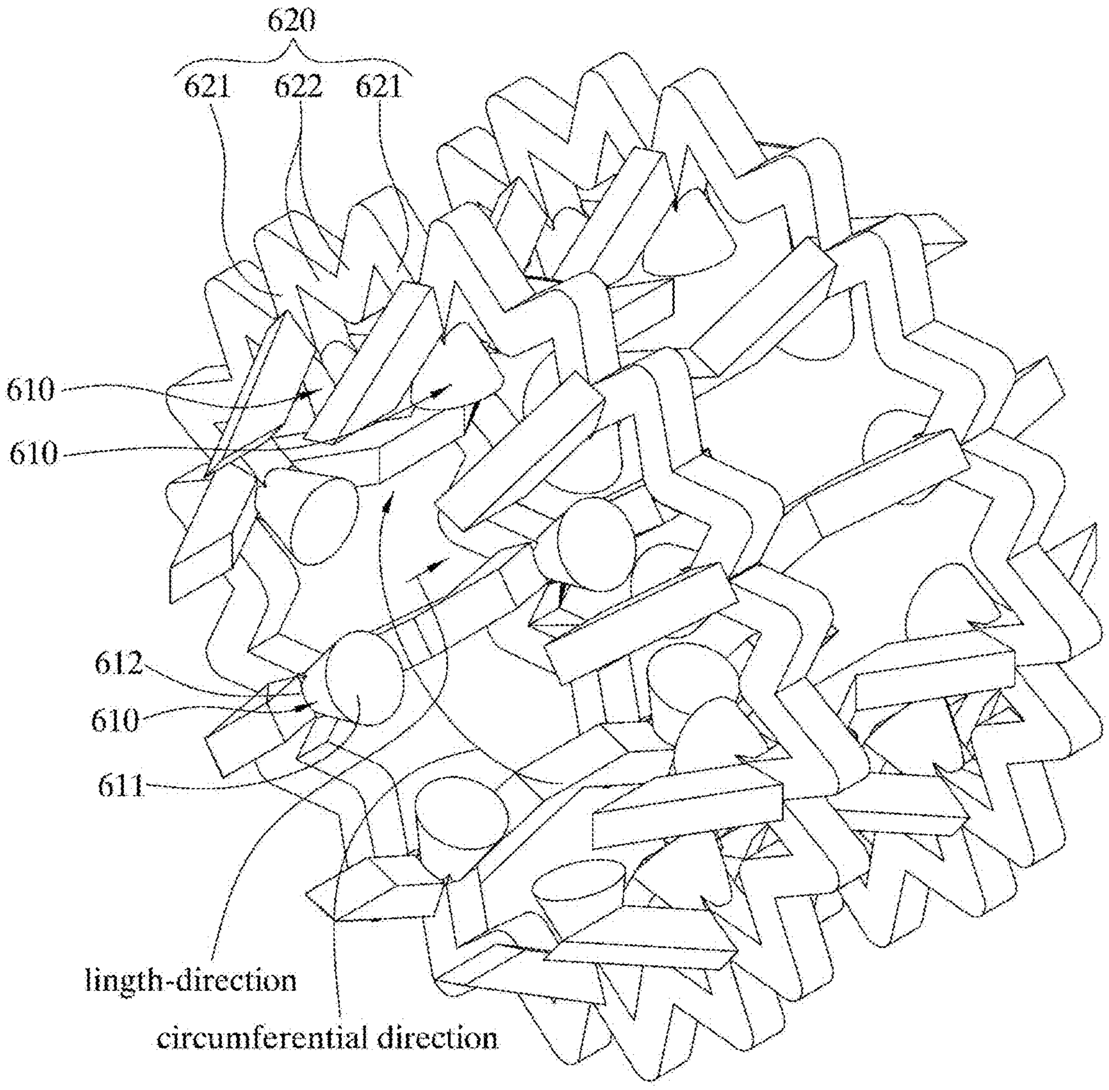
FIG. 6 illustrates a cylindrical array of a zero Poisson's ratio in which the structures according to the present disclosure are three-dimensionally arranged and the array is rolled such that a top face of a pillar faces inwardly.

FIG. 6 illustrates a cylindrical array according to the present disclosure. That is, the cylindrical array may be manufactured by rolling the planar array. This may indicate that the structures according to the present disclosure may be stacked in a manner corresponding to a desired application to achieve a target shape.

Figure 11:
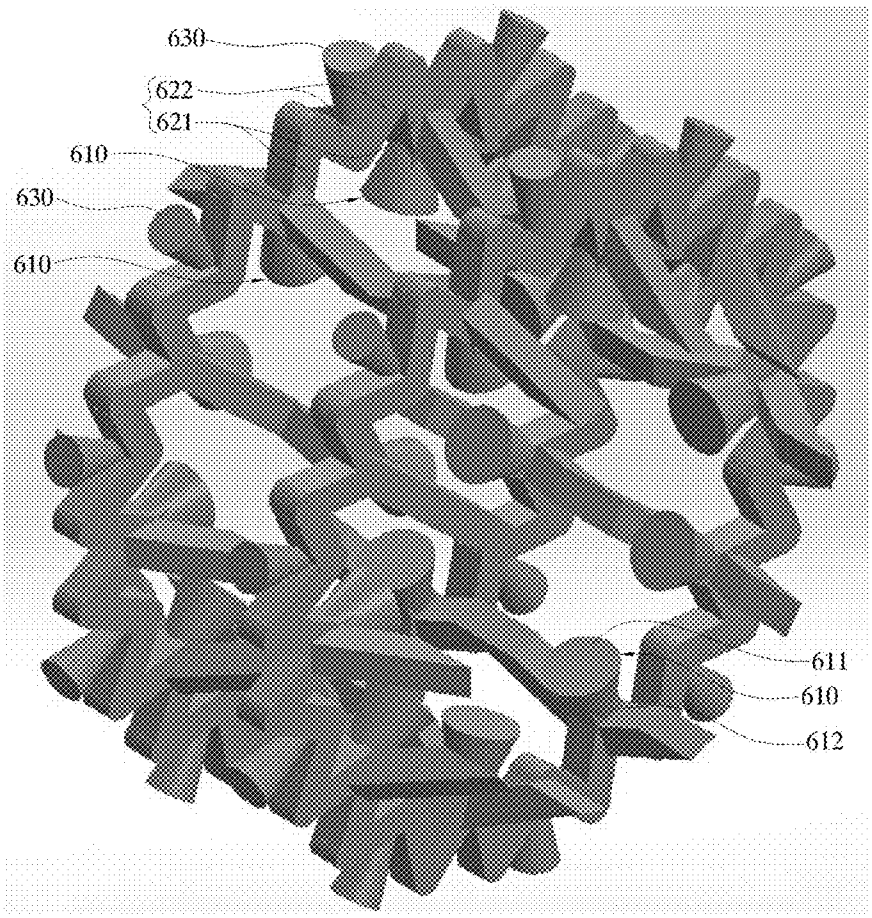
FIG. 11 illustrates the cylindrical array of FIG. 6 having legs.

The cylindrical array in which the structures of the zero Poisson's ratio according to the present disclosure are arranged three-dimensionally is shown in FIG. 6. FIG. 11 illustrates the cylindrical array of FIG. 6 having legs.

The cylindrical array in which the structures of the zero Poisson's ratio according to the present disclosure are arranged three-dimensionally includes central pillars 610 arranged in circumferential and length directions and on an outer face of an imaginary cylinder, wherein a top face of each pillar faces inwardly of the cylinder; four branched connectors 620 extending radially from each of the central pillars and toward a pillar adjacent thereto, wherein the four branched connectors are spaced from each other by an equal angular spacing, wherein each branched connector 620 includes a first segmental portion 621 extending inclinedly upwardly or downwardly from the central pillar; and a second segmental portion 622 extending inclinedly downwardly or upwardly from a distal point of the first segmental portion, wherein the extension directions of the first and second segmental portions are opposite to each other.

Each of an angle between the central pillar and the first segmental portion, and an angle between the first segmental portion and the second segmental portion is variable due to a force applied to the array.

In this case, in the cylindrical array in which the structures of zero Poisson's ratio are arranged in a three-dimensional manner such that a top face of the central pillar faces inwardly of the imaginary cylinder, the displacement in the length and circumferential directions of the cylinder due to a radial force outwardly from a center of the cylinder has no change.

The array further includes legs extending outwardly from distal points of the second segmental portions, respectively. The legs may include non-sharing legs positioned on a top and a bottom of the cylinder, and each sharing leg positioned between adjacent two central pillars and connected to two second segmental portions respectively extending from the adjacent two central pillars.

Figure 10:
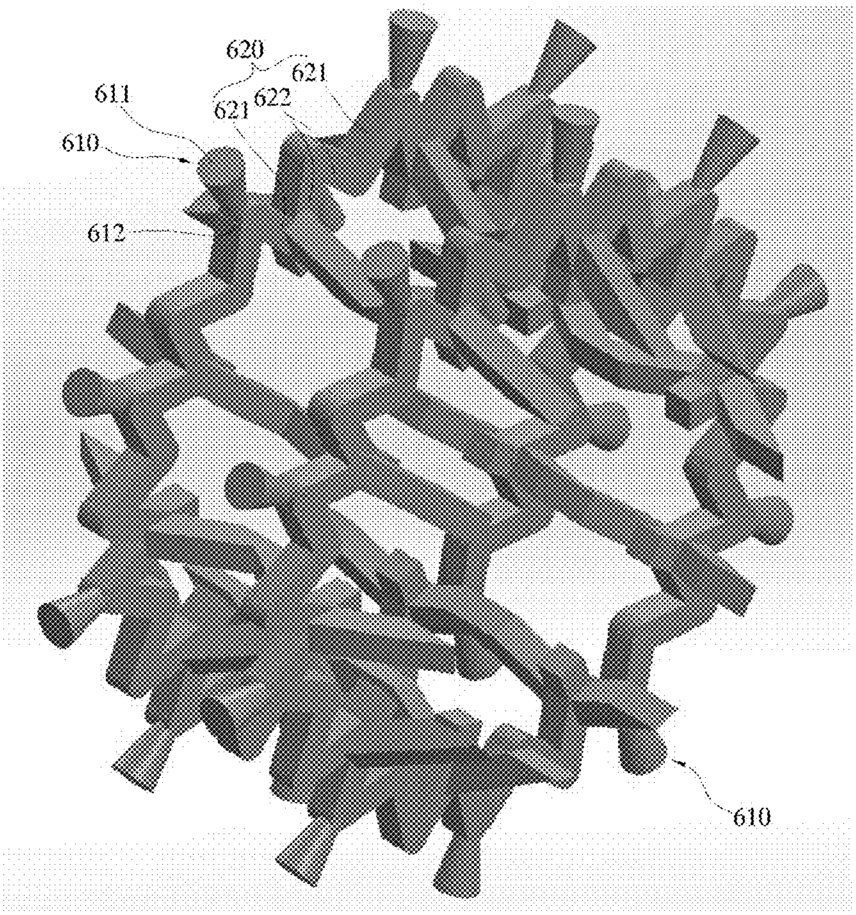
FIG. 10 illustrates a cylindrical array of a zero Poisson's ratio in which the structures according to the present disclosure are three-dimensionally arranged and the array is rolled such that a top face of a pillar faces outwardly.
Figure 12:
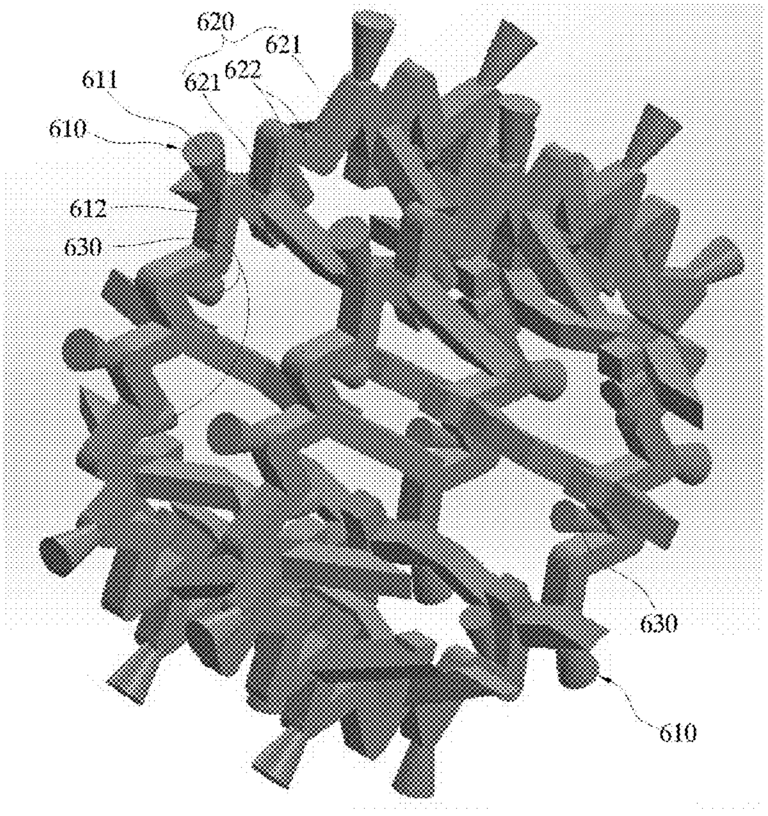
FIG. 12 illustrates the cylindrical array of FIG. 10 having legs.

FIG. 10 illustrates a cylindrical array of a zero Poisson's ratio in which the structures according to the present disclosure are three-dimensionally arranged and the array is rolled such that a top face of a pillar faces outwardly. FIG. 12 illustrates the cylindrical array of FIG. 10 having legs.

The present disclosure provides another example of a three-dimensional array of the structures of the zero Poisson's ratio.

A cylindrical array in which structures of a zero Poisson's ratio are arranged in a three dimensional manner is provided, wherein the array comprises: central pillars 610 arranged in circumferential and length directions and on an outer face of an imaginary cylinder, wherein a top face of each central pillar faces outwardly of the cylinder; and four branched connectors extending radially and inwardly from each of the central pillars and toward a central pillar adjacent thereto, wherein the four branched connectors are spaced from each other by an equal angular spacing, wherein each branched connector 620 includes: a first segmental portion 621 extending inclinedly upwardly or downwardly from the central pillar; and a second segmental portion 622 extending inclinedly downwardly or upwardly from a distal point of the first segmental portion, wherein the extension directions of the first and second segmental portions are opposite to each other.

Each of an angle between the central pillar and the first segmental portion, and an angle between the first segmental portion and the second segmental portion is variable due to a force applied to the array.

In this case, in the cylindrical array in which the structures of zero Poisson's ratio are arranged in a three-dimensional manner such that a top face of the central pillar faces outwardly of the imaginary cylinder, the displacement in the length and circumferential directions of the cylinder due to a radial force inwardly toward a center of the cylinder has no change.

The array further comprises legs 630 extending inwardly from distal points of the second segmental portions, respectively, wherein the legs includes: non-sharing legs positioned on a top and a bottom of the cylinder; and each sharing leg positioned between adjacent two central pillars and connected to two second segmental portions respectively extending from the adjacent two central pillars.

Figure 8:
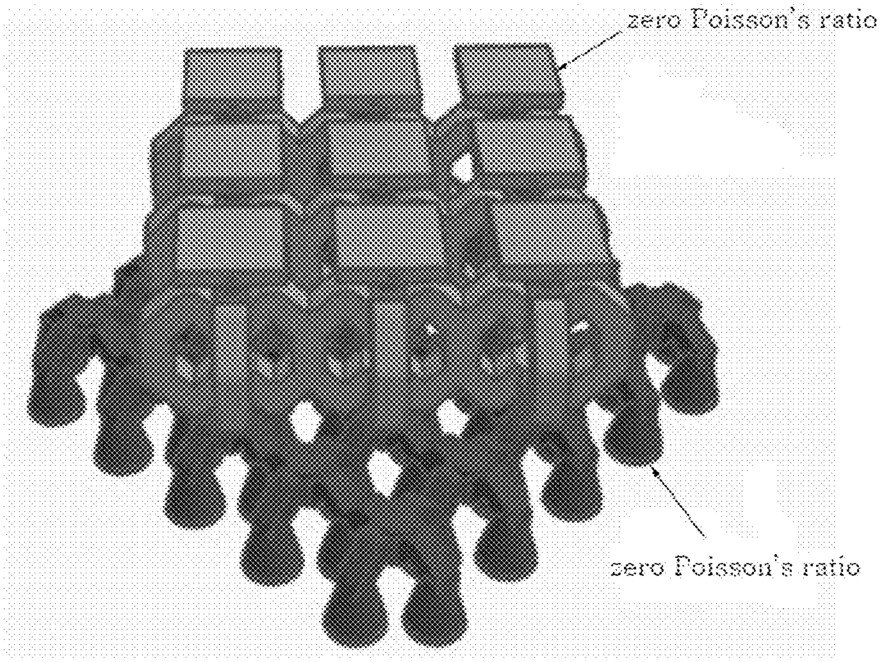
FIG. 8 illustrates a stack in which planar arrays of the structures of the zero Poisson's ratio according to the present disclosure are stacked in a three-dimensional manner.
Figure 9:
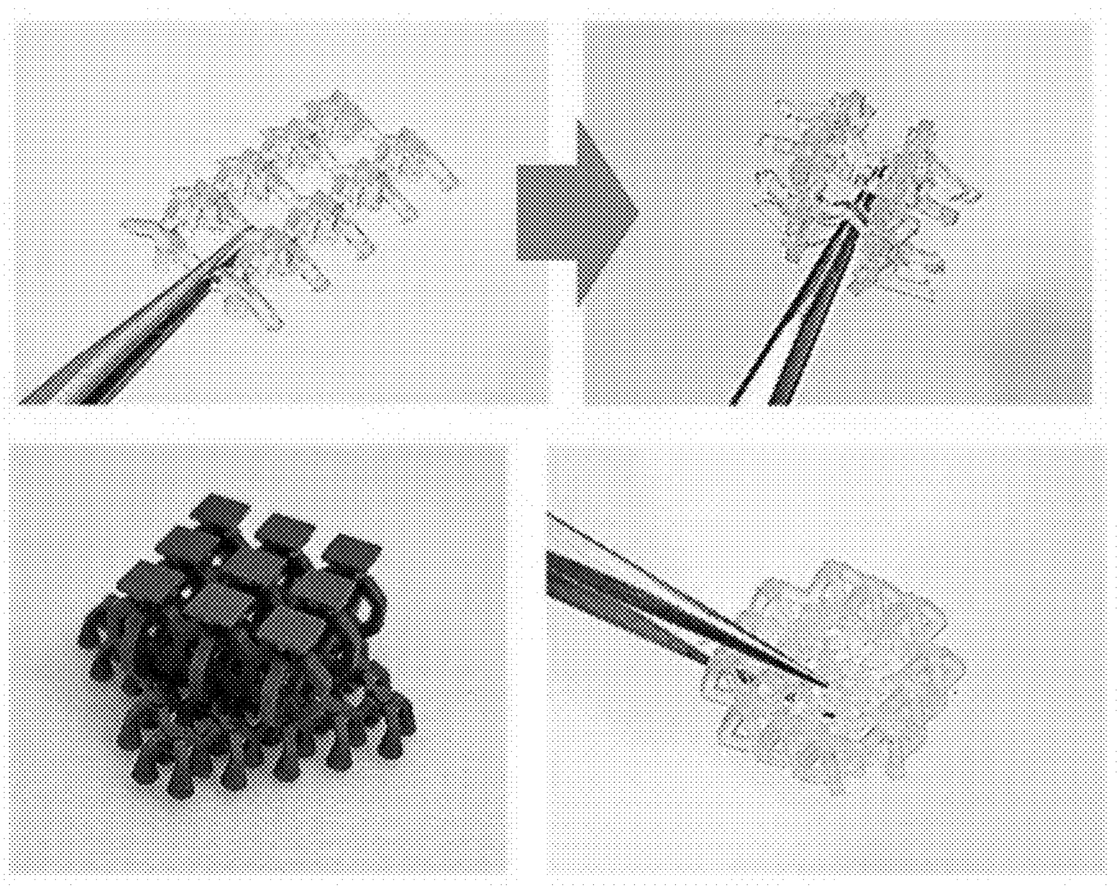
FIG. 9 is an image of a structure according to the present disclosure manufactured via 3D printing.

In another aspect of the present disclosure, the present disclosure provides a stack in which planar arrays of the structures of the zero Poisson's ratio according to the present disclosure are stacked in a three-dimensional manner. For example, FIG. 8 illustrates such a stack in which planar arrays of structures of a zero Poisson's ratio according to the present disclosure may be stacked in such a three-dimensional manner. As another example, FIG. 9 is an image of a structure according to the present disclosure manufactured via 3D printing.

The physical properties of the planar array may be modified based on the environment to vary the characteristics of the three-dimensional stack.

In still another aspect, the present disclosure provides a hybrid type planar array of structures having a zero Poisson's ratio.

For example, the hybrid type planar array of structures having a zero Poisson's ratio may include a planar array of the structures of zero Poisson's ratio arranged in the form of the matrix form and in a plane, and structures extending from the non-sharing legs located at the sides of the matrix form and having the larger vertical dimension and having the positive Poisson's ratio, wherein the planar array of the structures of zero Poisson's ratio are surrounded with the structures having the positive Poisson's ratio. This array may act as a negative pressure chamber.

Figure 7:
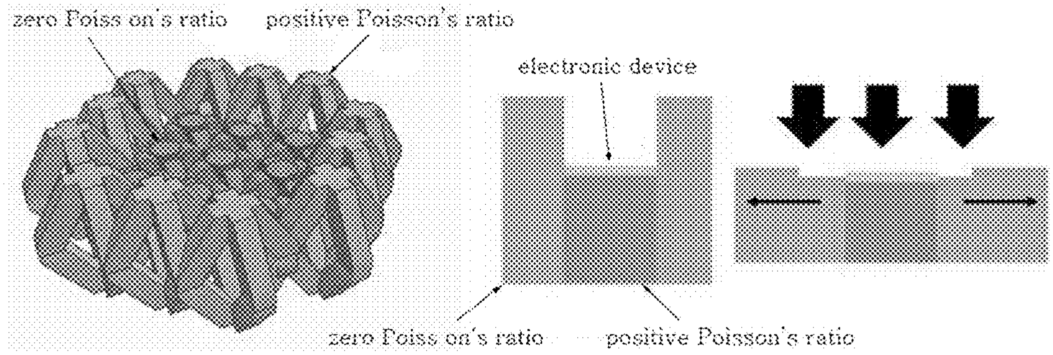
FIG. 7 illustrates a hybrid type planar array of structures having a zero Poisson's ratio according to the present disclosure.

FIG. 7 illustrates the hybrid type planar array of structures having a zero Poisson's ratio according to the present disclosure. This array implements an adhesive sensor that mimics a sucker of an octopus. The structures having the positive Poisson's ratio are arranged in the outer portion of the array, while the zero Poisson's ratio structures are arranged in an inner portion of the array. When pressure is applied to the array, the structures with the positive Poisson's ratio stretch in a wide manner, thereby increasing a bonding area, and thus increases a bonding force. However, the structures of the zero Poisson's ratio in the inner area do not stretch even under pressure. Therefore, when an electronic circuit is placed on the array of the zero Poisson's ratio structures, an adhesive sensor that has high adhesion and is hardly subjected to mechanical noise under external pressure stimulation may be achieved.

Although the embodiments of the present disclosure have been described in more detail with reference to the accompanying drawings, the present disclosure is not necessarily limited to these embodiments. The present disclosure may be implemented in various modified manners within the scope not departing from the technical idea of the present disclosure. Accordingly, the embodiments disclosed in the present disclosure are not intended to limit the technical idea of the present disclosure, but to describe the present disclosure. the scope of the technical idea of the present disclosure is not limited by the embodiments. Therefore, it should be understood that the embodiments as described above are illustrative and non-limiting in all respects. The scope of protection of the present disclosure should be interpreted by the claims, and all technical ideas within the scope of the present disclosure should be interpreted as being included in the scope of the present disclosure.

What is claimed is:

1. A zero Poisson's ratio structure comprising:

a central pillar; and four branched connectors extending radially from a lower end of the central pillar, wherein the branched connectors are spaced from each other by an equal angular spacing of 90 degrees, wherein each of the branched connectors includes: a first segmental portion extending inclinedly upwardly or downwardly from the central pillar; and a second segmental portion extending inclinedly downwardly or upwardly from a distal point of the first segmental portion, wherein extension directions of the first and second segmental portions are opposite to each other; and each leg extending perpendicularly downwardly from a distal point of each of the second segmental portions, wherein due to a force pressing the central pillar, each of an angle between the central pillar and the first segmental portion, an angle between the first segmental portion and the second segmental portion, and an angle between the second segmental portion and the leg is variable, wherein there is little displacement of the structure in a horizontal direction perpendicular to the pressing force, and wherein the structure has a modulus of elasticity in a range of Kilo to Mega Pascal.

2. The zero Poisson's ratio structure of claim 1, wherein the structure includes an elastic structure.

3. The zero Poisson's ratio structure of claim 1, wherein the branched connectors are spaced from each other by an equal angular spacing.

4. The zero Poisson's ratio structure of claim 1, wherein a value determined based on a following Equation 1 when a length of the leg is h, a length of the second segmental portion is l, and an angle between the second segmental portion and an imaginary horizontal line perpendicular to the leg is θ is defined as $\upsilon_p$, wherein a value determined based on the following Equation 1 when the length of the leg is h, a length of the first segmental portion is l, and an angle between the first segmental portion and the imaginary horizontal line perpendicular to the leg is θ is defined as $\upsilon_n$, and $$\upsilon = \frac{[h/l + \sin(\theta)\sin(\theta)]}{\cos^2(\theta)}, \quad \text{(Equation 1)}$$

wherein absolute values of $\upsilon_p$ and $\upsilon_n$ are equal to each other.

5. The zero Poisson's ratio structure of claim 1, wherein lengths of the first segmental portion and the second segmental portion are equal to each other, and wherein an angle between an imaginary horizontal line perpendicular to the leg and the first segmental portion is equal to an angle between the imaginary horizontal line perpendicular to the leg and the second segmental portion.

6. A planar array of structures of a zero Poisson's ratio arranged in a matrix form and in a plane, wherein the array comprises:

central pillars arranged in a matrix form and spaced from each other by a regular spacing;

four branched connectors extending from a lower end of each central pillar in a radial direction and toward a central pillar adjacent thereto, wherein the four branched connectors are spaced from each other by an equal angular spacing, wherein each of the branched connectors includes:

a first segmental portion extending inclinedly upwardly or downwardly from the central pillar; and a second segmental portion extending inclinedly downwardly or upwardly from a distal point of the first segmental portion, wherein the extension directions of the first and second segmental portions are opposite to each other; and legs extending perpendicularly downwardly from distal points of the second segmental portions, respectively, wherein the legs include non-sharing legs positioned at each of outer edges of the matrix form, and each sharing leg positioned between adjacent two central pillars and connected to two second segmental portions respectively extending from the adjacent two central pillars, wherein due to a force pressing the central pillar, each of an angle between the central pillar and the first segmental portion, an angle between the first segmental portion and the second segmental portion, and an angle between the second segmental portion and the leg is variable, and wherein each of the structures has a modulus of elasticity in a range of Kilo to Mega Pascal.

7. A cylindrical array in which structures of a zero Poisson's ratio are arranged in a three dimensional manner, wherein the array comprises:

central pillars arranged in circumferential and length directions and on an outer face of an imaginary cylinder, wherein a top face of each central pillar faces inwardly of the cylinder; and four branched connectors extending radially and outwardly from each of the central pillars and toward a central pillar adjacent thereto, wherein the four branched connectors are spaced from each other by an equal angular spacing, wherein each branched connector includes:

a first segmental portion extending inclinedly upwardly or downwardly from the central pillar; and a second segmental portion extending inclinedly downwardly or upwardly from a distal point of the first segmental portion, wherein the extension directions of the first and second segmental portions are opposite to each other, wherein each of an angle between the central pillar and the first segmental portion, and an angle between the first segmental portion and the second segmental portion is variable due to a force applied to the array, and wherein each of the structures has a modulus of elasticity in a range of Kilo to Mega Pascal.

8. The array of claim 7, wherein the array further comprises:

legs extending outwardly from distal points of the second segmental portions, respectively, wherein the legs includes:

non-sharing legs positioned on a top and a bottom of the cylinder; and each sharing leg positioned between adjacent two central pillars and connected to two second segmental portions respectively extending from the adjacent two central pillars.

9. A cylindrical array in which structures of a zero Poisson's ratio are arranged in a three dimensional manner, wherein the array comprises:

central pillars arranged in circumferential and length directions and on an outer face of an imaginary cylinder, wherein a top face of each central pillar faces outwardly of the cylinder; and four branched connectors extending radially and inwardly from each of the central pillars and toward a central pillar adjacent thereto, wherein the four branched connectors are spaced from each other by an equal angular spacing, wherein each branched connector includes:

a first segmental portion extending inclinedly upwardly or downwardly from the central pillar; and a second segmental portion extending inclinedly downwardly or upwardly from a distal point of the first segmental portion, wherein the extension directions of the first and second segmental portions are opposite to each other, wherein each of an angle between the central pillar and the first segmental portion, and an angle between the first segmental portion and the second segmental portion is variable due to a force applied to the array, and wherein each of the structures has a modulus of elasticity in a range of Kilo to Mega Pascal.

10. The array of claim 9, wherein the array further comprises legs extending inwardly from distal points of the second segmental portions, respectively, wherein the legs includes:

non-sharing legs positioned on a top and a bottom of the cylinder; and each sharing leg positioned between adjacent two central pillars and connected to two second segmental portions respectively extending from the adjacent two central pillars.

* * * * *